United States Patent [19]

Veldhoff

[11] Patent Number: 4,800,953
[45] Date of Patent: Jan. 31, 1989

[54] BAFFLE FOR COOLANT PASSAGE

[76] Inventor: James A. Veldhoff, 4968-138th Ave., Holland, Mich. 49423

[21] Appl. No.: 107,976

[22] Filed: Oct. 14, 1987

[51] Int. Cl.⁴ .......................... B29C 47/78; F28D 3/02
[52] U.S. Cl. .................................. 165/142; 29/157.3 R; 29/453; 165/76; 165/79; 138/38; 425/547; 425/190; 425/144
[58] Field of Search ............................ 165/142, 76, 79; 29/157.3 R, 453; 425/190, 144, 547, 552; 138/37, 38

[56] References Cited

U.S. PATENT DOCUMENTS

| | | |
|---|---|---|
| 186,411 | 1/1877 | Church . |
| 754,342 | 3/1904 | Philp . |
| 971,048 | 9/1910 | Koegler . |
| 1,037,224 | 9/1912 | Eremtrout . |
| 1,606,739 | 11/1926 | Averill . |
| 1,710,811 | 4/1929 | Dewald ................................ 165/79 |
| 2,359,288 | 10/1944 | Brinen . |
| 2,554,661 | 5/1951 | Clancy ............................. 165/142 X |
| 2,663,325 | 12/1953 | Bede . |
| 2,725,892 | 12/1955 | Gallistel . |
| 3,110,754 | 11/1963 | Witort et al. . |
| 3,548,863 | 12/1970 | Stippich . |
| 3,760,874 | 9/1973 | Boskovic . |
| 3,837,396 | 9/1974 | Newton . |
| 4,048,983 | 9/1977 | Pei ..................................... 165/142 X |
| 4,655,280 | 4/1987 | Takahashi ......................... 425/547 X |
| 4,655,704 | 4/1987 | Dekel ................................ 165/142 X |

FOREIGN PATENT DOCUMENTS

| | | | |
|---|---|---|---|
| 0002740 | 1/1982 | Japan .................................... 425/547 |
| 21094 | of 1904 | United Kingdom ................ 165/142 |

Primary Examiner—Samuel Scott
Assistant Examiner—Carl D. Price
Attorney, Agent, or Firm—Price, Heneveld, Cooper, DeWitt & Litton

[57] ABSTRACT

A baffle for partitioning fluid circulating passages that are provided in a structure for heat transfer purposes. The baffles are inserted without the need for extra drilling and tapping of the structure, and include an elongated, substantially flat body which is inserted into a passage to thereby partition the passage into two conduits, which act as supply and return conduits for fluid flow. The baffle further extends into another passage, through which fluid flows, to thereby block the flow of fluid and force the fluid to flow through the partitioned passage via the defined conduits. The baffle is held into position by resilient arms which project outwardly from the baffle and are received fully within the non-partitioned passage.

13 Claims, 2 Drawing Sheets

BAFFLE FOR COOLANT PASSAGE

BACKGROUND OF THE INVENTION

The present invention pertains to baffles, and in particular to a baffle for plastic injection molds and the like to circulate coolant.

In plastic injection molds and the like a heated material, such as plastic, is injected into the mold to thereby form the material into a particular shape. Molds are further provided with a network of passages which are utilized to effectuate heat transfer purposes. Typically, the fluid is used as a coolant means, however, there are certain occasions where the fluid may be used to supply heat, such as near the runners of a mold. In either case, the configuration of the item needing cooling (or heating) often requires that some passages be provided with only one opening. Obviously, it is preferred, to drive the passage entirely through the die or mold so that an inlet and outlet port may be provided to facilitate flow of the fluid therethrough. Yet, when the passage has only one opening, fluid will not flow therethrough without some intervention.

Prior artisans have inserted baffles into these passages to thereby divide them into two conduits The two conduits would run the length of the passage and be fluidly connected at the end wall of the passage. The conduits then would function as fluid supply and return channels for the passage. To direct the water through the conduits, the baffle would extend into a passage through which the flow of fluid existed and therein provide a barrier which would block the flow in that passage. The flow then would be directed around the baffle via the conduits before, once again, returning to the normally flowing passage.

In the past, the insertion of these baffles has been a problem. Typically an access opening is drilled into the die or mold opposite the passage to be partitioned. The opening is subsequently tapped in preparation for insertion of the baffle. Once this is accomplished the baffle can then be inserted into the passage through the access opening. Prior baffles are provided with plugs which are threadedly received into said openings so that the circulating fluid is not lost therethrough.

This system, while being functional, is time consuming and expensive. Furthermore, there is the ever present nuisance of fluid leakage through the extra openings. Hence, a new baffle and method of insertion has been in great need in the industry.

SUMMARY OF THE INVENTION

In the present invention, the baffles are inserted into the passages with only one opening, without the need for the drilling and tapping of access openings. The baffle is provided with means which project into the normally fluid flowing passage to thereby hold the baffle in its proper position. The means permits the baffle to be inserted through the passage to be partitioned, toward the fluid flowing passage, thereby obviating the need for an access opening.

In the preferred embodiment, the means includes at least one resilient arm which projects outwardly from the baffle's body near or at the end which functions as a barrier in the fluid flowing passage. The at least one arm projects outwardly beyond the passage sidewall in its unbiased state, but readily flexes inwardly toward the baffle's body to permit insertion of the baffle within the passage.

By using the baffle of the present invention the set up of the mold or die may be completed much quicker and more economically than by means previously available. Not only is the operation enhanced by the elimination of the drilling and tapping steps but also, by the fact that the insertion of the present baffles, which insert with a simple pushing operation, is quicker than the previous threading of each baffle into its respective opening. Also, the proper positioning of the present baffle is more easily accomplished than in the past, due to the fact that the baffle is merely inserted until the end abuts the far wall (i.e., the end acting as a barrier). This arrangement completely eliminates any guess work in determining the distance to insert the baffle into the passage. Furthermore, since the user can visually see the baffle body (instead of only the plug) the proper alignment of the baffle is more easily accomplished by the operator. Lastly, without the extra openings created by the drilling, the likelihood of fluid leakage is reduced.

These and other objects, advantages and features of the present invention will be more fully understood and appreciated by reference to the written specification and appended drawings.

DETAILED DESCRIPTION OF THE PREFERRED EMBODIMENT

Figure 3:
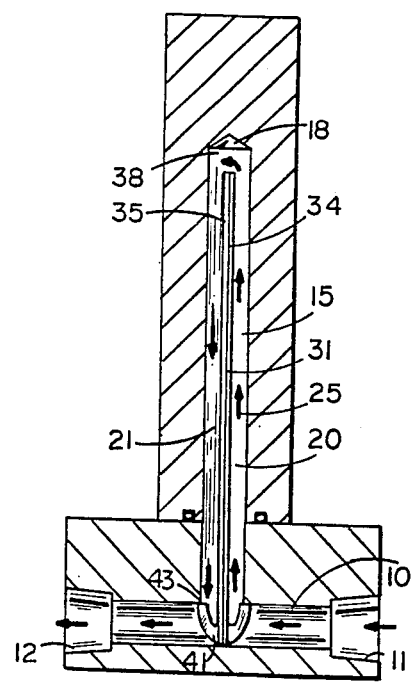
FIG. 3 is a cross section of the assembled mold structure and baffle illustrating the flow of fluid through the passages, taken along the plane III—III of FIG. 2.

In the preferred embodiment, baffle 30 is inserted into a fluid circulating passage 15 provided with only one opening. Baffle 30 includes an elongate, substantially flat body 31 that extends along the width of passage 15 to partition it into two parallel conduits 20, 21 fluidly coupled at the end wall 18 (FIG. 3). Body 31 also extends into a passage 10, through which fluid normally flows, and completely blocks the flow of fluid therethrough so that the fluid is forced into passage 15. To hold the baffle in its proper position a pair of resilient arms 41 project out from body 31 and are received within passage 10. Arms 41 are shaped to engage the sidewall of passage 10 to preclude baffle 30 from being forced upwardly (as seen in FIG. 3) or twisting sideways.

The mold 1 is generally illustrated as two portions 2, 3 joined together. In the preferred embodiment, lower portion 2 represents the manifold or a part of the mold and upper portion 3 represents the mold or another part of the mold, respectively. In any event, mold 1 includes a first passage 10 which is provided with an inlet and outlet port 11, 12. Ports 11, 12 fluidly connect to supply and return lines in a conventional manner and thereby establish a flow of fluid through passage 10. Extending upwardly (as illustrated in the figures) from passage 10 is a second passage 15 which is provided with only one opening. Second passage 15 has a first end 16 which opens into a sidewall of passage 10 and a second end 17 which is closed by end wall 18.

Figure 1:
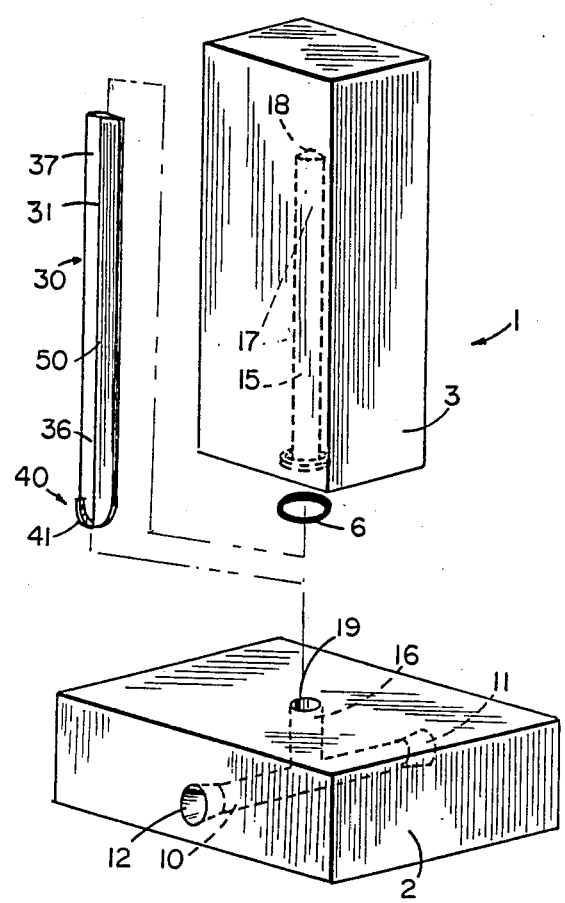
FIG. 1 is an exploded perspective view of a typical mold structure with the fluid circulating passages and the baffle which is the subject of this invention.
Figure 2:
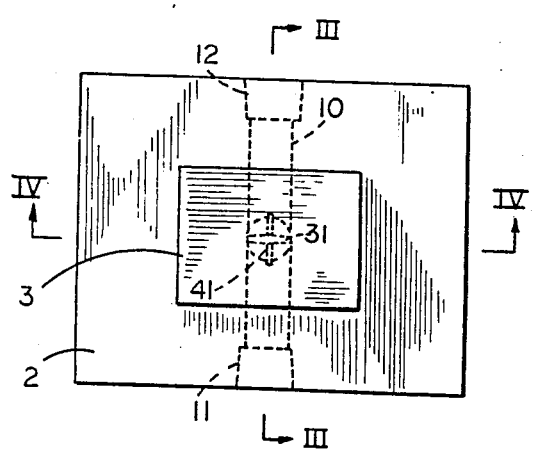
FIG. 2 is a top plan view of the assembled mold structure and baffle.
Figure 4:
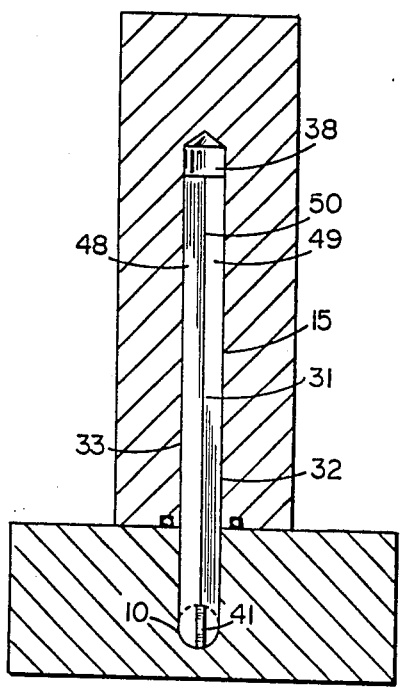
FIG. 4 is a cross section of the assembled mold structure and baffle taken along the plane IV—IV of FIG. 2.

Baffle 30 is generally composed of a plastic material, such as nylon, but could be composed of a variety of materials possessing the requisite characteristics. As can be seen in FIG. 1, baffle 30 comprises an elongated, substantially flat body 31. Body 31 is shaped to have a width substantially equal to the width of passages 10 and 15. Body 31 is further provided with first and second edges 32, 33 which are adapted to snugly engage opposite sidewalls of passage 15 when baffle 30 is inserted therein. A first end 36 of body 31 is received through passage 15 and into passage 10. First end 36 is configured to engage the entire periphery of passage 10 that is opposite passage 15. In the preferred embodiment, first end 36 is provided with a semicircular end to correspond to the circular shape of passage 10 (FIG. 4). More specifically, first and second edges 32, 33 are arcuately shaped at first end 36 to so define the semicircular configuration. Baffle 30 then completely blocks passage 10 and prohibits the fluid from flowing directly through massage 10 from inlet port 11 to outlet port 12.

As stated above, baffle 30 extends across the width of passage 15 and thereby partitions it into two parallel conduits 20, 21. When inserted, baffle 30 is provided with a second end 37 which extends upwardly from passage 10 to a point just short of end wall 18 (FIGS. 3 and 4). The gap 38 defined by second end 37 and end wall 18 acts to fluidly connect the two conduits 20, 21.

As seen in FIG. 3, baffle 30 effectively directs the fluid to flow through second passage 15 and thereby facilitates the needed heat transfer with (for example) the molded part. The flow of fluid (as illustrated by arrows 25) enters passage 10 via inlet port 11 and continues therethrough until encountering baffle 30. At this point, the fluid is forced to flow into the supply conduit 20 in a direction toward end wall 18. Upon reaching second end 37 of baffle 30, the fluid flows through gap 38 and into return conduit 21 which directs the flow back to passage 10 where it then goes to outlet port 12.

To keep the flow of fluid from forcing baffle 3 out of passage 10 or from twisting sideways therein, which would frustrate the flow pattern discussed above, baffle 30 is provided with a means 40 for holding it into its proper position. Holding means 40 is fully received within passage 10 and cooperates therewith to maintain baffle 30 in position.

In the preferred embodiment, holding means 40 includes a pair of resilient arms 41 which are attached to first and second sidewalls 34, 35 of baffle 30, and project outwardly therefrom. Arms 41 are arcuate in shape and include a first attached end 42 and a second free end 43. Further, arms 41 are curved, with a gradually sloping surface 44, so that their free ends 43 project in the direction toward second end 37.

Figure 5:
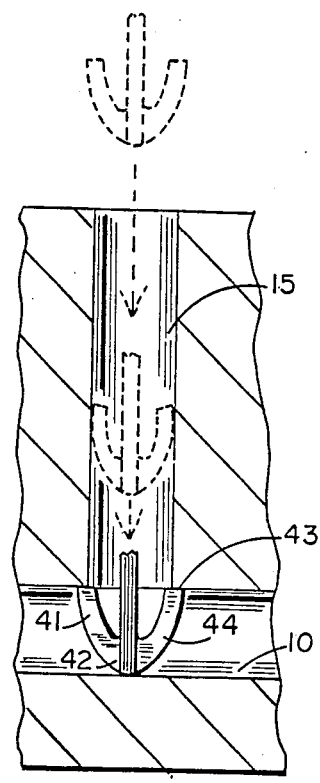
FIG. 5 is an enlarged cross section of the intersecting passages of FIG. 3 illustrating the insertion of the baffle.

Resilient arms 41 are constructed so that they project outwardly a combined distance which is greater than the width of passage 15. Hence, when baffle 30 is inserted into passage 15, arms 41 engage the sidewalls thereof and due to the gradually sloped surface 44 are easily biased inwardly toward body 31 (FIG. 5). At the point where first end 36 abuts the sidewall of passage 10, arms 41 are fully received within passage 10 and expand outwardly to their unbiased position. Arms 41, when properly positioned, extend directly upward (as seen in FIG. 5) and engage the sidewall of passage 10 adjacent to first end 16 of passage 15. In this position arms 41 lie in a plane that contains the longitudinal axis of both passages 10 and 15. Free ends 43 of arms 41 therefore engage the most upward point of the sidewall of passage 10 (as seen in FIG. 5). This positioning of arms 41 precludes baffle 30 from being forced out of its proper position. The square engagement of free ends 43 with the sidewall of passage 10 keeps baffle 30 from being forced out of passage 10 toward end wall 18. Also, because free ends 43 engage the most upward portion of the sidewall of passage 10 (as illustrated in FIGS. 3 and 5), the arms hold baffle 30 from twisting sideways. The twisting motion is resisted by arms 41, because to so twist baffle 30 would require arms 41 to be bent downward along the sidewalls of passage 10. Therefore, arms 41 simply and securely hold baffle 30 in place.

Body 31 is shaped so as to be thicker along its longitudinal axis than along its edges 32, 33 (FIG. 1). Each of the sidewalls 34, 35, then, include first and second inclined surfaces 48, 49 that meet at the body's longitudinal axis and form thereat a ridge 50. This configuration of body 31 adds extra strength and rigidity thereto, to ensure that it is not deformed out of shape or position by the fluid flow or during insertion of the baffle 30.

The assembly of baffle 30 is accomplished in an easy and quick manner. As best seen in FIG. 1, mold 1 is composed of upper and lower portions 2, 3. Second passage 15 is included in both portions in such a way that its first end 16 is contained in lower portion 2. Before upper portion 3 is mounted on lower portion 2, baffle 30 is inserted into passage 15 downwardly toward passage 10. As first end 36 of baffle 30 is pushed into passage 15, sloping surfaces 44 of resilient arms 41 are engaged by rim 19 of passage 15. This engagement biases resilient arms 41 inwardly as baffle 30 is pushed through passage 15 until first end 16 abuts the far sidewall of passage 10. At this point, arms 41 spring back into the unbiased position to thereby hold the baffle in its proper position. Since ends 43 of arms 41 are designed to engage the uppermost surface of passage 10 (as illustrated in the Figures), arms 41 will only spring back when baffle 30 has been properly positioned. If the baffle is not positioned squarely so as to completely block passage 10, the operator need only twist baffle 30 until arms 41 spring back and baffle 30 can no longer be removed. Once all of the baffles have been thusly inserted, upper portion 3 may be attached to lower portion 2 by any well known means. It is noted, that since passage 15 extends through both portions, that the two portions are sealed by any conventional means, such as by O-ring 6 (FIG. 1). As can be seen, therefore, baffle 30 may be inserted into mold 1 in a quick and easy manner.

Of course, it is understood that the above is merely a preferred embodiment of the invention, and that various other embodiments as well as many changes and alterations may be made without departing from the spirit and broader aspects of the invention.

The embodiments of the invention in which an exclusive property or privilege is claimed are defined as follows:

1. A plastic injection mold or the like comprising:
   a structure which includes fluid circulating passages including a first passage having an inlet and an outlet through which fluid flows, and a second passage having a side wall defining a predetermined diameter, first end which opens into said first passage and a second end which is closed; and a baffle including an elongated body having a pair of sides and a pair of opposed edges, said body extending through said second passage and positioned such that said sides extend laterally thereacross so that the opposed edges of said body snugly engage opposite sidewalls of said second passage to thereby partition said second passage into two conduits fluidly connected at said second end of said second passage, said first end of said body further extends into said first passage and substantially blocks said first passage, said baffle further including a retaining structure projecting outwardly beyond said side wall of said second passage from at least one of said body sides to engage a sidewall of said first passage for holding and positioning said body in place, whereby said fluid flow is directed to flow around said baffle through said conduits as said fluid flows from said inlet to said outlet.

2. The plastic injection mold of claim 1 in which said retaining structure is arcuate in shape and provided with a first end fixed to said body and a free end, wherein said retaining structure is curved such that said free end projects generally in a direction towards said second end of said body and is thereby positioned to engage said sidewall of said first passage adjacent said first end of said second passage.

3. The plastic injection mold of claim 2 in which said retaining structure includes an arm connected to said first end of said body and oriented to project substantially orthogonally outward from a medial portion of one of said sides of said body.

4. The baffle of claim 2 in which said at least one retaining structure comprises two resilient arms that project outwardly in opposite directions from said body.

5. The plastic injection mold of claim 1 in which said first end of said body is shaped to engage substantially the entire periphery of a sidewall defining said first passage, whereby the fluid is substantially blocked from flowing through said first passage from said inlet to said outlet without first flowing through said second passage.

6. The plastic injection mold of claim 5 in which said second end of said body is spaced from said second end of said second passage to fluidly connect said first and second conduits whereby fluid is forced to flow through the entire length of said second passage.

7. The baffle of claim 1 in which said body includes a longitudinal axis which is substantially parallel to said second passage, wherein said body is thicker along said longitudinal axis than along said edges, such that said body comprises a slight ridge on each said sides along said longitudinal axis, and wherein said sides each include first and second inclined surfaces which slope gradually toward said edges from said ridge.

8. The baffle of claim 1 in which said first end of said body is shaped to engage substantially the entire periphery of a sidewall defining said first passage which is opposite said first end of said second passage, whereby the fluid is substantially blocked from flowing through said first passage from said inlet to said outlet without first flowing through said second passage.

9. The plastic injection mold of claim 1 in which said retaining structure projects from said one body side in a direction substantially longitudinally along said first passage.

10. The plastic injection mold of claim 1 in which said retaining structure includes an arm connected to said first end of said body and oriented to project outward from a medial portion of one of said sides of said body.

11. A method of assembling a baffle into fluid circulating passages wherein said method comprises:

providing a first structure which includes a first passage provided with an inlet and an outlet through which fluid flows and a second passage which is provided with a first end which opens into a first side portion of said first passage;

providing a baffle which includes an elongated body having a pair of sides and at least one resilient retaining member attached to and projecting from one pair of said sides near a first end of said baffle;

inserting said first end of said baffle into said second passage such that said pair of sides extend laterally thereacross so that said body snugly engages opposite sidewalls of said second passage and concurrently biasing said at least one resilient retaining member toward said body;

passing said baffle through said second passage toward said first passage until said baffle abuts a second sidewall portion of said first passage; and further positioning said baffle so that said at least one resilient retaining member projects outward axially along and within said first passage.

12. The method of claim 11 in which said retaining member of said provided baffle includes at least one resilient arm having a first end fixed to said body and a free end, wherein said free end is biased toward said body when said baffle is inserted into said second passage, and extends outward to engage said sidewall of said first passage adjacent said second passage when said baffle is properly positioned.

13. The method of claim 11 in which a second structure is provided which includes a continuation of said second passage wherein said second structure is mounted on said first structure, after proper positioning of said baffle, such that a second end of said baffle is received in said continuation of said second passage in said second structure.

* * * * *

UNITED STATES PATENT AND TRADEMARK OFFICE
CERTIFICATE OF CORRECTION

PATENT NO. : 4,800,953

DATED : January 31, 1989

INVENTOR(S) : James A. Veldhoff

It is certified that error appears in the above-identified patent and that said Letters Patent is hereby corrected as shown below:

Column 3, line 25:

"massage" should be -- passage --;

Column 3, line 44:

"baffle 3" should be -- baffle 30 --;

Column 6, claim 11, line 28:

"one pair of said sides" should be -- one of said pair of sides --.

Signed and Sealed this

Fourteenth Day of November, 1989

Attest:

JEFFREY M. SAMUELS

Attesting Officer     Acting Commissioner of Patents and Trademarks